US012281765B2

(12) United States Patent
Greenberg et al.

(10) Patent No.: US 12,281,765 B2
(45) Date of Patent: Apr. 22, 2025

(54) SYSTEMS FOR OPTIMIZING ACCESS TO INTERNAL COMPONENTS OF A LIGHT FIXTURE

(71) Applicant: Stickbulb LLC, Long Island City, NY (US)

(72) Inventors: Russell Greenberg, New York, NY (US); Christopher Beardsley, Rye, NY (US); Minchul Hong, Long Island City, NY (US)

(73) Assignee: Stickbulb LLC, Long Island City, NY (US)

( * ) Notice: Subject to any disclaimer, the term of this patent is extended or adjusted under 35 U.S.C. 154(b) by 0 days.

(21) Appl. No.: 18/128,891

(22) Filed: Mar. 30, 2023

(65) Prior Publication Data

US 2023/0349518 A1 Nov. 2, 2023

Related U.S. Application Data

(60) Provisional application No. 63/325,319, filed on Mar. 30, 2022.

(51) Int. Cl.
*F21S 4/28* (2016.01)
*F21S 2/00* (2016.01)
(Continued)

(52) U.S. Cl.
CPC ................. *F21S 4/28* (2016.01); *F21S 2/005* (2013.01); *F21V 3/049* (2013.01); *F21V 15/01* (2013.01);
(Continued)

(58) Field of Classification Search
CPC .. F21S 4/28; F21S 2/005; F21V 3/049; F21V 15/01; F21V 17/164
See application file for complete search history.

(56) References Cited

U.S. PATENT DOCUMENTS 10,011,986 B2 * 7/2018 White ..................... E04B 9/006
10,113,724 B2 * 10/2018 Satterfield ............. F21V 15/013
(Continued)

FOREIGN PATENT DOCUMENTS

WO 2019/212540 A1 11/2019

OTHER PUBLICATIONS

Russell Greenberg, Christopher Beardsley, Minchul Hong, Stickbulb LLC, Systems for Optimizing Access to Internal Components of a Light Fixture, International Application No. PCT/US23/16976, filed Mar. 30, 2023, United States of America.
(Continued)

*Primary Examiner* — Arman B Fallahkhair
(74) *Attorney, Agent, or Firm* — DUANE MORRIS LLP

(57) ABSTRACT

In some embodiments, a light fixture may include a lighting enclosure having two sides, two ends, and a top and bottom section that define a channel. The light fixture may further include a light module disposed that may include a first and a second core section. The first core section may have a first retention element. The second core section may have a second retention element. The first retention element may be configured to engage the second retention element, releasably coupling the first and second core section together. The light fixture may also include a light source operatively coupled the second core section.

33 Claims, 17 Drawing Sheets

(51) Int. Cl.

| | |
|---|---|
| ***F21V 3/04*** | (2018.01) |
| ***F21V 15/01*** | (2006.01) |
| ***F21V 17/16*** | (2006.01) |
| ***F21Y 115/10*** | (2016.01) |

(52) U.S. Cl.

CPC ......... *F21V 17/164* (2013.01); *F21Y 2115/10* (2016.08)

(56) References Cited

U.S. PATENT DOCUMENTS

| | | | | |
|---|---|---|---|---|
| 10,151,462 | B1 * | 12/2018 | Satterfield | F21V 21/048 |
| D880,043 | S | 3/2020 | Guerra et al. | |
| 10,672,376 | B1 | 6/2020 | Pickens et al. | |
| 11,015,776 | B2 * | 5/2021 | Gomez Martinez | F21S 8/043 |
| 11,125,400 | B2 * | 9/2021 | Miles | F21V 31/005 |
| 11,181,262 | B2 * | 11/2021 | Yaphe | G02B 6/0088 |
| 11,211,040 | B2 * | 12/2021 | Czech | F21V 23/003 |
| D959,030 | S | 7/2022 | Patterson et al. | |
| 11,555,589 | B1 * | 1/2023 | Geiger | F21S 8/043 |
| D994,186 | S | 8/2023 | Rotondi et al. | |
| D1,017,100 | S | 3/2024 | Guerra et al. | |
| 11,927,325 | B1 * | 3/2024 | Lu | F21S 2/005 |
| 2011/0075416 | A1 * | 3/2011 | Chou | F21V 29/70 362/373 |
| 2011/0090681 | A1 | 4/2011 | Hobson et al. | |
| 2014/0168955 | A1 | 6/2014 | Gershaw | |
| 2015/0124443 | A1 | 5/2015 | Reingruber et al. | |
| 2018/0031217 | A1 * | 2/2018 | Tuchler | F21V 21/04 |
| 2018/0059318 | A1 | 3/2018 | Nichol et al. | |
| 2018/0087728 | A1 | 3/2018 | Leichner | |
| 2018/0320873 | A1 | 11/2018 | Veltri et al. | |
| 2019/0063729 | A1 | 2/2019 | Vang et al. | |
| 2020/0149712 | A1 | 5/2020 | DiFelice et al. | |
| 2022/0107454 | A1 | 4/2022 | Yeo et al. | |
| 2022/0268430 | A1 | 8/2022 | Porter et al. | |

OTHER PUBLICATIONS

Jul. 5, 2023 International Search Report and Written Opinion of the International Searching Authority for PCT International Application No. PCT/US23/16976 (11 pages).

Sep. 24, 2024 International Preliminary Report on Patentability issued by the International Bureau of WIPO for International PCT Application No. PCT/US2023/016976 (9 pages).

Dec. 18, 2024 Office Action issued by the U.S. Patent and Trademark Office for U.S. Appl. No. 35/002,365, 12 pages.

* cited by examiner

SYSTEMS FOR OPTIMIZING ACCESS TO INTERNAL COMPONENTS OF A LIGHT FIXTURE

CROSS-REFERENCE TO RELATED APPLICATION

This application claims the benefit of priority under 35 U.S.C. § 119(e) to prior U.S. Provisional Patent Application No. 63/325,319 filed on Mar. 30, 2022, the disclosure of which is incorporated by reference herein in its entirety.

FIELD OF DISCLOSURE

The present disclosure relates to light fixtures. More specifically, the present disclosure relates to optimized light fixtures for improved maintenance and disassembly access. The optimized light fixture of the present disclosure is also designed to reduce the embodied carbon of the light fixture.

BACKGROUND OF THE INVENTION

Climate change is changing the definition of a good lighting fixture design. Conventionally, light fixtures were not designed to reduce the embodied carbon within the light fixtures. Presently, architectural linear lighting fixtures with up and/or down-facing light arrays are typically constructed from monolithic extruded aluminum enclosures with an internal cavity scaled to hold light emitting diode (LED) drivers and external troughs containing LED boards with corresponding diffusers/lensing. LEDs and drivers can fail during use, so it is standard practice to allow for some way to access internal components for maintenance. This access is typically made through the top-facing and/or bottom-facing diffuser/LED package. The access is designed this way because the aluminum extrusion forms both the structure, internal features, and cosmetic exterior surface of the light. In these conventional designs, the only available area to access the internal geometry of the extruded shape is through the openings that hold the LED arrays themselves. Typically, architectural lighting designs have LED boards mounted to a metal tray that is selectively removable from the housing of the fixture. This is necessary to lift the LEDs out of the way so that the drivers (stored behind) can be accessed.

For example, FIG. 1A-1C illustrate a conventional light fixture 1 with a driver 2 powering LED 3 on LED tray 4 being diffused by diffuser 5 within a housing 6 undergoing maintenance. In order to conduct maintenance, such as repair or replace an LED 3, LED tray 4, or driver 2, the conventional diffuser 5 would have to be removed in order to access the internal parts of the conventional light fixture 1. Typically, architectural lighting designs have LED 3 boards mounted to a metal LED tray 4 that is selectively removable from the housing 6 of the conventional light fixture 1. This is necessary to lift the LEDs 3 out of the way so that the drivers 2, which are stored behind the LED tray 4, can be accessed. This conventional design has many disadvantages as discussed below.

The conventional light fixture 1 designs are cost effective, which is a reason why these designs dominate the marketplace. However, the conventional designs come with disadvantages. These disadvantages can include: (1) damage to the diffuser 5 during removal of the diffuser 5; (2) damage to the LEDs 3 during removal of LEDs 3; and (3) removal of the LED 3 array to gain access to the drivers requires additional wire slack to allow for the LED 3 array to be moved without disconnecting electrical connection. The aforementioned disadvantages create waste through the need for more diffusers 5, LEDs 3, and longer wire. The more wire that is used, the more metal is required than necessary causing waste. Additionally, because of the large amounts of aluminum making up the structure for the light fixture more anodization or powder-coating is required to cover the entire surface area of the structure, which is both the cosmetic exterior and functional interior of the fixture. The functional and structural requirements of the conventional light fixture 1 structure create a shape with a sizeable surface area, much of which does not functionally need to be coated in paint.

The present disclosure addresses the aforementioned challenges and problems regarding sustainability. The optimized light fixture of the present disclosure includes special sustainability features that reduce the embodied carbon of the light fixture by decreasing the volume of mined materials (e.g., metal, paint coatings, wire, etc.) that have large carbon footprints. Further, the optimized light fixture also makes it easy to access and replace the subcomponents most likely to fail, such as the drivers and LEDs thereby prolonging the lifespan of the light fixture itself.

SUMMARY OF THE INVENTION

In some embodiments, a light fixture may include a lighting enclosure having a first side and a second side, a first end and a second end, and a top section and a bottom section that all define a channel within the lighting enclosure. The light fixture may also include at least one light module disposed within the lighting enclosure. The light module may have a first core section and a second core section. The first core section may have a first retention element disposed on the first core section. The second core section may have a second retention element disposed on the second core section. The first retention element may be configured to engage the second retention element, releasably coupling the first core section and the second core section together allowing side access to a plurality of internal components of the light fixture. The light module may also include at least one light source operatively coupled to a top portion of the second core section.

In some embodiments, a light fixture may include a lighting enclosure having a first side and a second side, a first end and a second end, and a top section and a bottom section that all define a channel within the lighting enclosure. The light fixture may also include a plurality of light modules disposed within the lighting enclosure. Each of the plurality of light modules may include a first core section and a second core section. The first core section may have first retention element disposed on the first core section and the second core section may have a second retention element disposed on the second core section. The first retention element may be configured to engage the second retention element, releasably coupling the first core section and the second core section together allowing side access to a plurality of internal components of the light fixture. The plurality of light modules may have at least one first light source operatively coupled to a top portion of the second core section. The plurality of light modules may have at least one second light source operatively coupled to a bottom portion of the second core section.

In some embodiments, a light fixture may include a lighting enclosure having a first side and a second side, a first end and a second end, and a top section and a bottom section that all define a channel within the lighting enclosure. The light fixture may also include at least one light module disposed within the lighting enclosure that has a first core section and a second core section, wherein the first core section has a first retention element disposed on the first core section and the second core section has a second retention element disposed on the second core section, and wherein the first retention element is configured to engage the second retention element, releasably coupling the first core section and the second core section together allowing side access to a plurality of internal components of the light fixture. The light fixture may also have at least one light source operatively coupled to a bottom portion of the second core section.

BRIEF DESCRIPTION OF THE DRAWINGS

The features and advantages of the present disclosure will be more fully disclosed in, or rendered obvious by, the following detailed descriptions of example embodiments. The detailed descriptions of the example embodiments are to be considered together with the accompanying drawings wherein like numbers refer to like parts and further wherein.

Figures 1A, 1B, 1C:
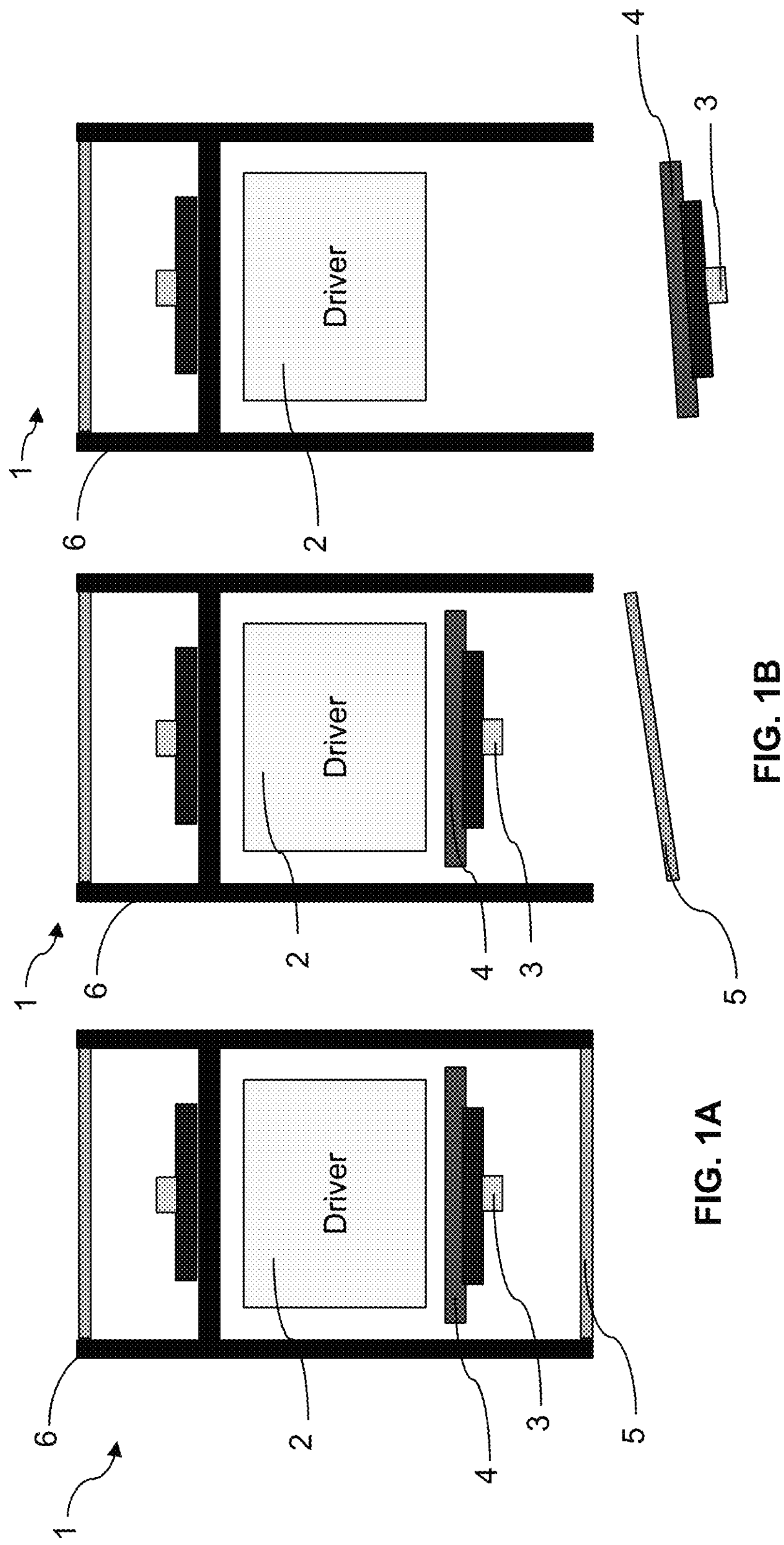
FIGS. 1A-1C illustrate the removal of a diffuser and light emitting diode tray for a conventional light fixture.

While the present disclosure is susceptible to various modifications and alternative forms, specific embodiments have been shown by way of example in the drawings and will be described in detail herein. It should be understood, however, that the present disclosure is not intended to be limited to the particular forms disclosed. Rather, the present disclosure is to cover all modifications, equivalents, and alternatives falling within the spirit and scope of the disclosure as defined by the appended claims.

DETAILED DESCRIPTION

This description of the exemplary embodiments is intended to be read in connection with the accompanying drawings, which are to be considered part of the entire written description. It should be understood, however, that the present disclosure is not intended to be limited to the particular forms disclosed and that the drawings are not necessarily shown to scale. Rather, the present disclosure covers all modifications, equivalents, and alternatives that fall within the spirit and scope of these exemplary embodiments. In the description, relative terms such as “lower,” “upper,” “horizontal,” “vertical,” “above,” “below,” “up,” “down,” “top,” and “bottom” as well as derivatives thereof (e.g., “horizontally,” “downwardly,” “upwardly,” etc.) should be construed to refer to the orientation as then described or as shown in the drawing under discussion. These relative terms are for convenience of description and do not require that the apparatus be constructed or operated in a particular orientation. Terms concerning attachments, coupling and the like, such as “connected” and “interconnected,” refer to a relationship wherein structures are secured or attached to one another either directly or indirectly through intervening structures, as well as both movable or rigid attachments or relationships, unless expressly described otherwise. The terms “couple,” “coupled,” “operatively coupled,” “operatively connected,” and the like should be broadly understood to refer to connecting devices or components together either mechanically, or otherwise, such that the connection allows the pertinent devices or components to operate with each other as intended by virtue of that relationship.

The present disclosure is directed to an optimized light fixture that enables easy access to the internal components of the light fixture while also minimizing the use of mined materials though the use of other materials such as plastic and/or wood. Mined materials can include, but are not limited to, aluminum, steel, or other “carbon-intensive materials” that require vast amounts of energy to process and ship. These mined materials have high carbon footprints and it is necessary to minimize their use whenever possible. Even recycled aluminum (while requiring only 5% of the energy to process than virgin aluminum) requires many times more energy to process than wood. The use of biogenic material, such as wood or other low-carbon-intensive material, is contemplated in order to reduce the carbon footprint of the optimized light fixture. For example, wood requires a fraction of the energy that is required to process than the metals used in the conventional light fixture designs. The arrangement of the optimized light fixture only uses mined materials where necessary, and maximizes the utilization of biogenic materials. In some embodiments, the biogenic materials used in the optimized light fixture are carbon sinks and can sequester carbon, such as wood.

The optimized light fixture of the present disclosure improves the ease and efficiency of EOL (End Of Life) processing of the light fixture components and allows for multiple form factors and light-shielding geometries to be achieved without the need to invest in a large inventory of specialized metal parts. The technical benefits described herein are achieved through a combination of features including: a two-part aluminum core with side-loading access to internal subcomponents, which reduces the volume of metal, wire, and paint coatings needed to construct the fixture, thereby reducing its global warming potential.

Some of the novel and improved features of the optimized light fixture include, but are not limited to: (1) two-part aluminum core with side-access; (2) accessibility to internal components via side-access panel; (3) substitution of wood for metal to reduce carbon footprint, perform light shading function, and camouflage the internal lighting modules; (4) ability to achieve asymmetrical treatment of light shading without need for customized metal extrusions/components; (5) module type B (non-continuous metal enclosure) to reduce embodied carbon of long-length continuous fixtures; (6) side-loading re-coil hanging feature; (7) side-loading diffuser; and (8) side-loading LED. These novel and improved features are illustrative of some of the advantages of one or more embodiments of the optimized light fixture that will be further disclosed below.

In various embodiments, the optimized light fixture includes an extruded aluminum core clad in wooden profiles with metal end caps. Lighting modules can be connected together in continuous runs. The internal components of the optimized light fixture can be accessed via a side-loading access panel for easy assembly, installation, maintenance, and EOL processing.

Figure 2B:
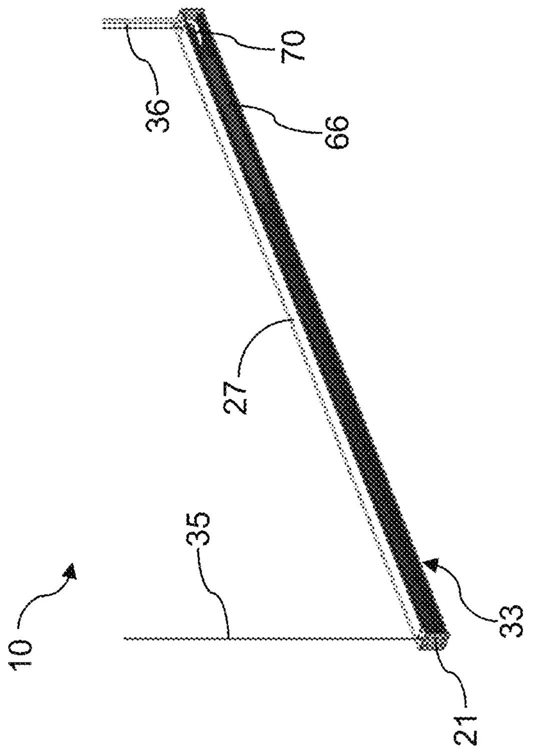
FIG. 2B illustrates an isometric view of an optimized light fixture in accordance with a side removed in accordance with some embodiments.
Figure 2A:
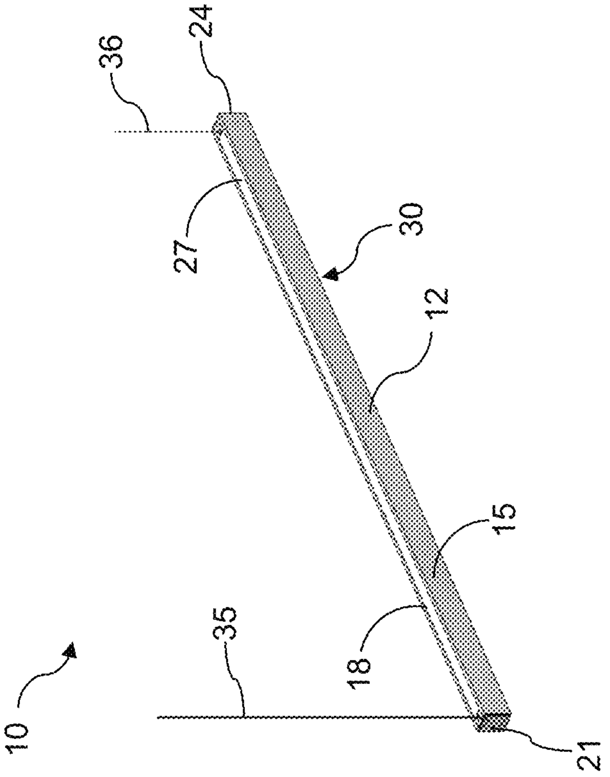
FIG. 2A illustrates an isometric view of an optimized light fixture in accordance with some embodiments.
Figure 3:
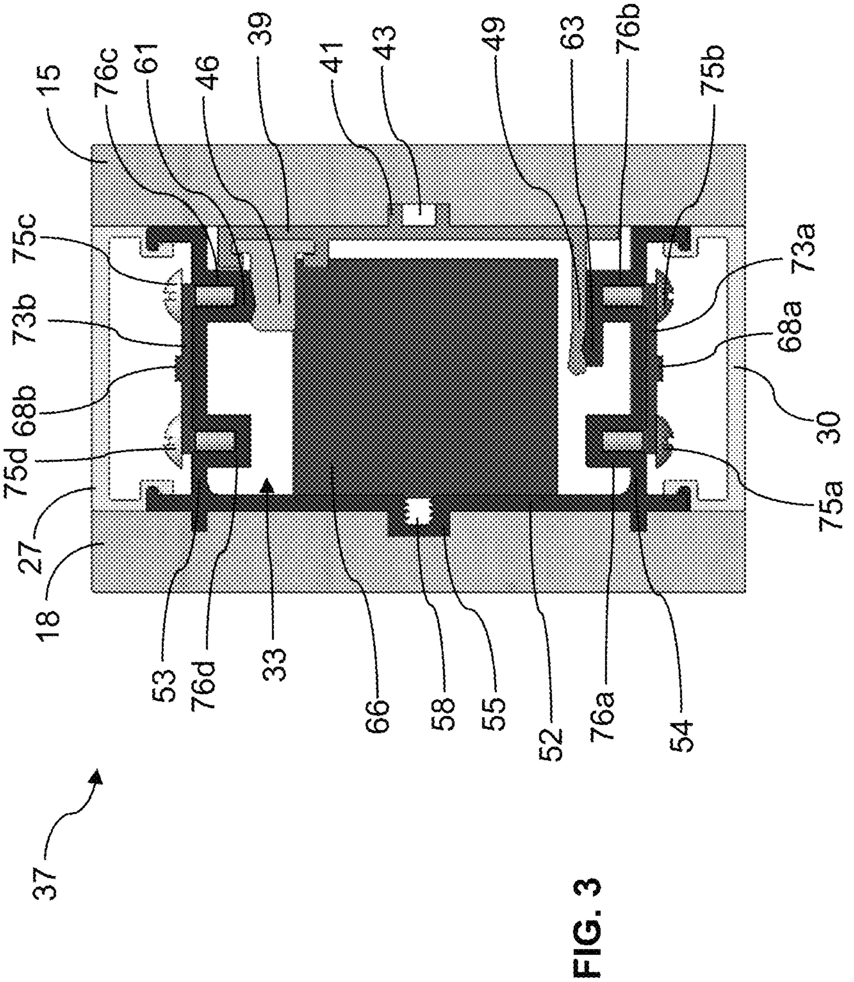
FIG. 3 illustrates a cross sectional view of a light module in accordance with some embodiments.
Figure 4:
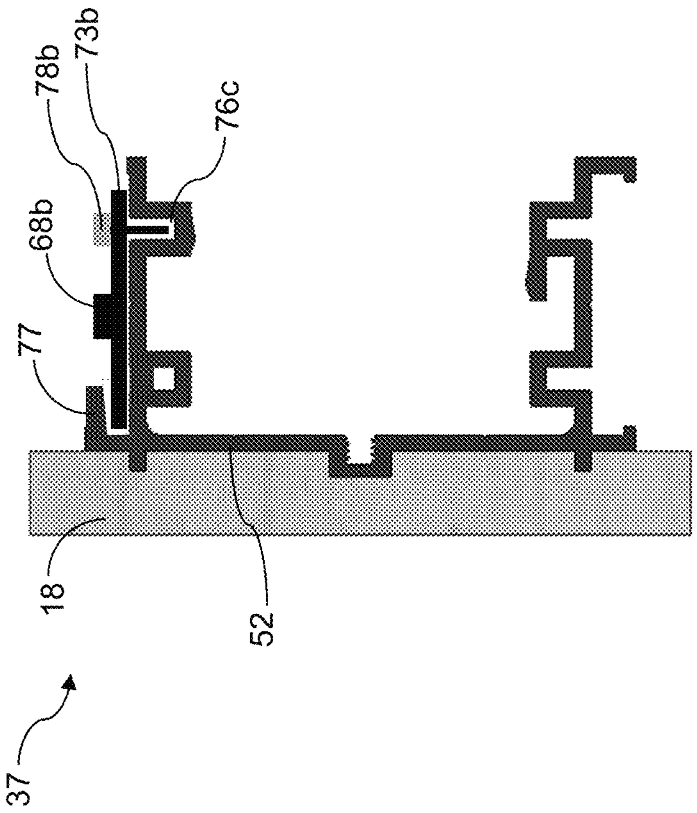
FIG. 4 illustrates a cross sectional view of an alternative light module in accordance with some embodiments.

Referring now to FIGS. 2-4, the optimized light fixture 10 has a lighting enclosure 12 that is substantially rectangular, like a beam. The lighting enclosure 12 has a first side 15 and a second side 18, a first end 21 and a second end 24, and a top section 27 and a bottom section 30 that define a channel 33 within the lighting enclosure 12. The top section 27 and the bottom section 30 each comprise a diffuser that are configured to diffuse the light coming from the lighting enclosure 12. In one or more embodiments of the invention, the first side 15 and the second side 18 of the lighting enclosure 12 are made of wood, further reducing the carbon footprint of the optimized light fixture 10. In some embodiments, the optimized light fixture 10 can be hung from the ceiling or other structure with a first cable 35 and a second cable 36. In other embodiments, the optimized light fixture 10 can be flush mounted to the ceiling or a wall.

The optimized light fixture 10 further comprises at least one light module 37. The light module 37 has a first core section 39 that is disposed within the channel 33 along the length of the first side 15 of the lighting enclosure 12. The first core section 39 is operatively coupled to the first side 15 of the lighting enclosure 12 with a first fixation element 41, such as spaced apart arms, that is sized to fit within a notch 43 of the first side 15 of the lighting enclosure 12. A threaded screw can then be used to fixate the first core section 39 to the first side 15 of the lighting enclosure 12. In other embodiments, the first core section 39 can be fixed to the first side 15 of the lighting enclosure 12 with only a screw. One of ordinary skill in the art will appreciate other ways to fixate the first core section 39 to the first side 15 of the lighting enclosure 12. The first core section 39 further comprises a first retention element configured to couple with a second core section 52. For example, a hook 46 and a flange 49 may be used as a retention element, and are configured to releasably couple the first core section 39 with a second core section 52 allowing side access the a plurality of internal components of the optimized light fixture 10. The use of the hook 46 and the flange 49 are just one example of providing a first retention element. One of ordinary skill in the art will appreciate other ways to couple the first core section 39 and the second core section 52 together. For example, a screw, spring loaded hinge, just a flange 49, or just a hook 46 could also be used.

The light module 37 further includes the second core section 52 disposed with the channel 33 along the length of the second side 18 of the lighting enclosure 12. The second core section 52 has a top portion 53 and a bottom portion 54. The second core section 52 is operatively coupled to the second side 18 of the lighting enclosure 12 with a second fixation element 55, such as a protrusion, that is sized to fit within an aperture 58 disposed on the channel 33 facing side of the second side 18 of the lighting enclosure 12. A threaded screw can then be used to fix the second core section 52 to the second side 18 of the lighting enclosure 12. In other embodiments, the second core section 52 can be fixed to the second side 18 of the lighting enclosure 12 with only a screw. One of ordinary skill in the art will appreciate other ways to fixate the second core section 52 to the second side 18 of the lighting enclosure 12. The second core section 52 further comprises a second retention element configured to engage the first retention element of the first core section 39. For example, the second retention may include a first retaining feature 61 disposed on the top portion 53 of the second core section 52. The second core section 52 also has a second retaining feature 63 disposed on the bottom portion 54 of the second core section 52. The first retaining feature 61 is configured to engage the hook 46 and the second retaining feature 63 is configured to engage the flange 49, releasably coupling the first core section 39 and the second core section 52 together allowing side access to a plurality of internal components of the optimized light fixture 10. The use of the first retaining feature 61 and the second retaining feature 63 are just one example of providing a second retention element. One of ordinary skill in the art will appreciate other ways to couple the first core section 39 and the second core section 52 together. For example, a screw, spring loaded hinge, just a first retaining feature 61, or just a second retaining feature 63 could also be used.

The optimized light fixture 10 may further include at least one driver 66 that is disposed between the coupling of the first core section 39 and the second core section 52. The driver 66 is configured to power and regulate at least one light source when supplied with line voltage from power cord 70. For example, the light source 68 may be an LED 68*a* operatively coupled to an LED board 73*a*, which is operatively coupled to the bottom portion 54 of the second core section 52 in order to provide light in a downward direction. In some embodiments, a second LED 68*b* is operatively coupled to a second LED board 73*b*, which is operatively coupled to the top portion 53 of the second core section 52 in order to provide light in an upward direction. The LED boards 73*a-b* may be operatively coupled through the use of threaded screws 75*a-d* that are sized to fit within threaded apertures 76*a-d* disposed within the second core section 52. In other embodiments, one edge of the LED boards 73*a-b* may be operatively coupled to the second core section 52 through a lip 77 defined by the second core section 52. The other edge of the LED board 73*a-b* may be operatively coupled to the second core section 52 with a fastener 78, such as screw or clip within aperture 76*c*, to allow easy installation and removal as illustrated in FIG. 4. The lip 77 can be tapered to accommodate various board depths. Although the light source of the present disclosure is directed to an LED, a person of ordinary skill in the art will appreciate that the light source can be any other light source such as incandescent or halogen to give a few examples.

The optimized light fixture 10 may have different types of light modules 37 depending on the embodiment. For example, module type A may be continuous throughout the lighting enclosure 12 and include drivers 66 disposed within the coupling of the first core section 39 and the second core section 52. The driver 66 in the light module 37 may need to be fully enclosed in metal according to Underwriter Laboratories (UL) regulations. However, in some embodiments, the light module 37 may not contain a driver 66, and therefore does not need a complete metal enclosure. Thus, the material of the first core section 39 and the second core section 52 may depend on the type of light module 37. Further, type A module may include a continuous module running the length of the lighting enclosure 12. Alternatively, a type B light module may be a non-continuous light module within the lighting enclosure 12, meaning there may be a plurality of light modules 37 contained within the lighting enclosure 12. In some embodiments, drivers 66 can be remote instead of disposed within the light module 37 as described above. For example, the power to the light source could come in through power cord 70.

Figure 5B:
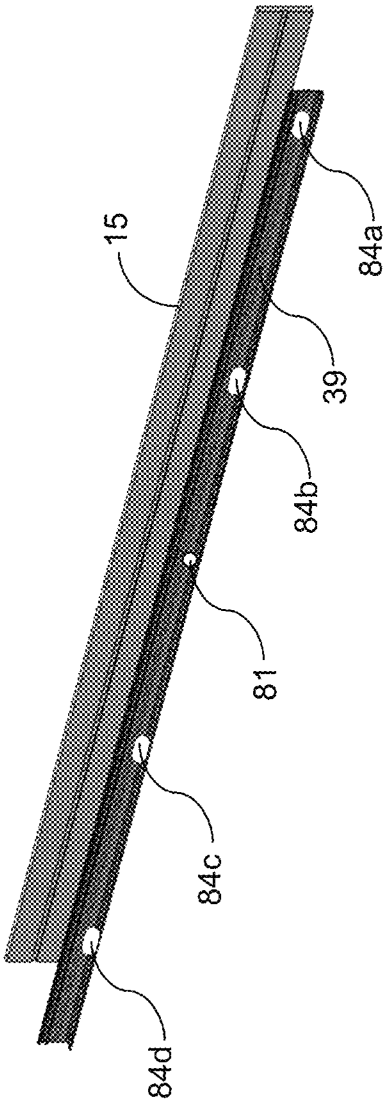
FIGS. 5A-5B illustrates an isometric view of the first core section of a light module in accordance with some embodiments.
Figure 5A:
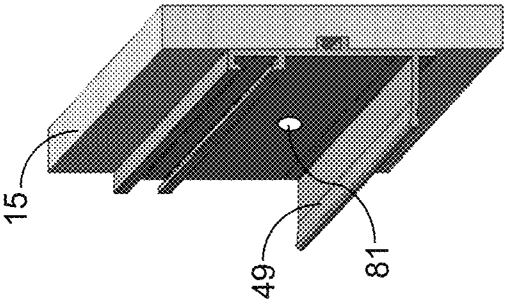

The light module 37 has been discussed thus far as having only one discrete module. However, a plurality of light modules 37 can be disposed within the channel 33 of the lighting enclosure 12. As illustrated in FIGS. 5A-5B, the first core section 39 may be a rail that runs the majority of the length of the first side 15 of the lighting enclosure 12. The first core section 39 would be fixedly coupled to the first side 15 of the lighting enclosure 12 with a threaded screw through the first fixture aperture 81. The first core section 39 may also have slotted holes 84*a-d* that allows the first core section 39 to expand and contract since the first core section 39 may expand at a different rate than the first side 15 of the lighting enclosure 12. The first core section 39 may not run the full length of the first side 15 of the lighting enclosure 12 to provide a tolerance gap on the outer edges of the first core section 39 for the expected expansion and contraction.

Figure 6:
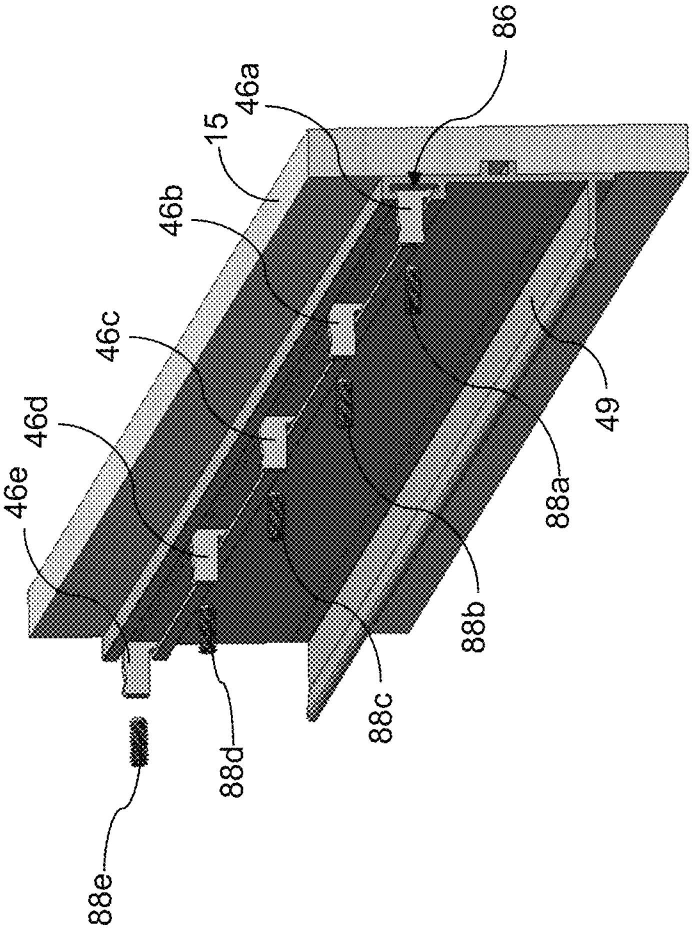
FIG. 6 illustrates an isometric view of a first core section of a light module with hooks attached in accordance with some embodiments.

As illustrated in FIG. 6, with the first core section 39 running the majority of the length of the first side 15 of the lighting enclosure 12 a plurality of light modules 37 may be arranged in the lighting enclosure 12. In this non-limiting example, a plurality of hooks 46*a-e* can be operatively coupled to the first core section 39 in order to provide an engagement surface for the second core section 52. The hooks 46*a-e* can be secured to the first core section 39 by sliding the hooks 46*a-e* into aperture 86 of the first core section 39. The aperture 86 allows the ability to adjust the hooks 46*a-e* anywhere along the first core section 39. The hooks 46*a-e* can be further secured with fasteners 88*a-e*, such as set screws, locking the hooks 46*a-e* to the first core section 39. However, it is contemplated that other mechanical fasteners may be used and is not limited by the example shown in FIG. 6. In other embodiments of the invention, mechanical fasteners may not be needed and the hooks 46*a-e* may stay in place with friction alone.

Figure 7C:
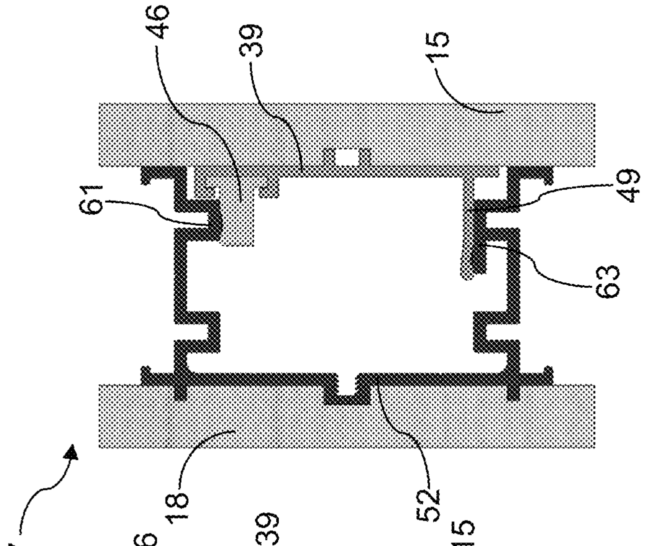
FIGS. 7A-7C illustrate the attachment of a light module in accordance with some embodiments.
Figure 7B:
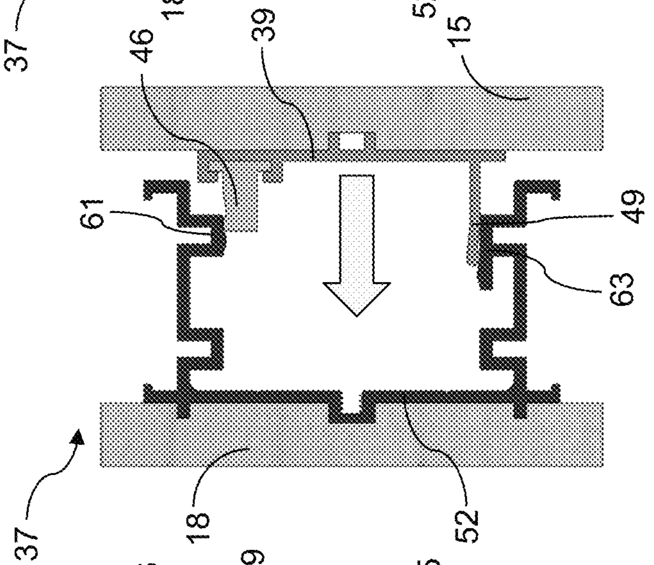
Figure 7A:
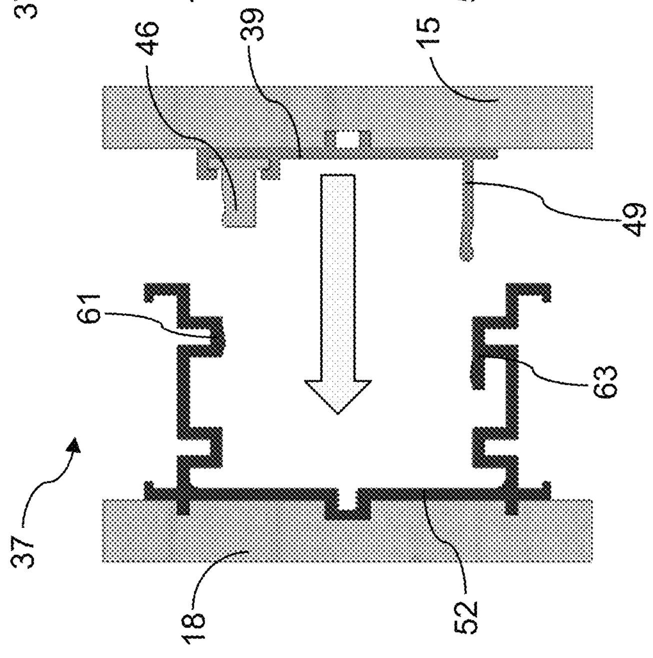
Figure 8B:
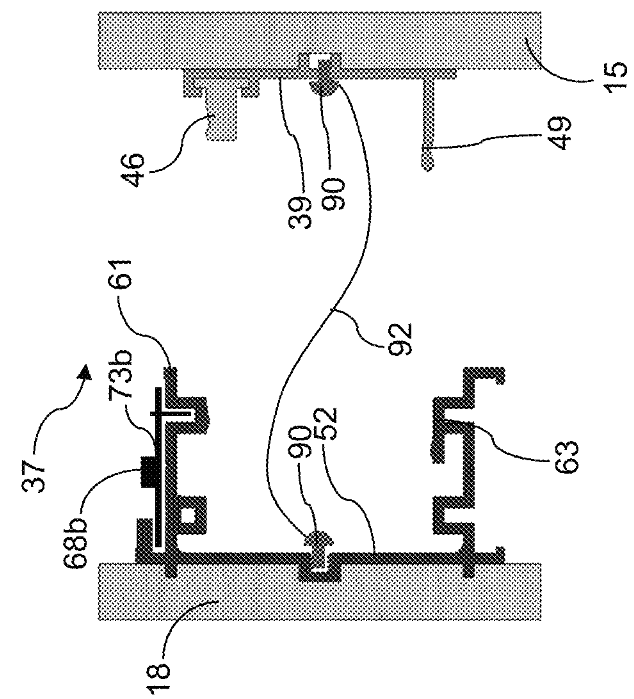
FIGS. 8A-8B illustrate an alternative mechanism to attach a light module in accordance with some embodiments.
Figure 8A:
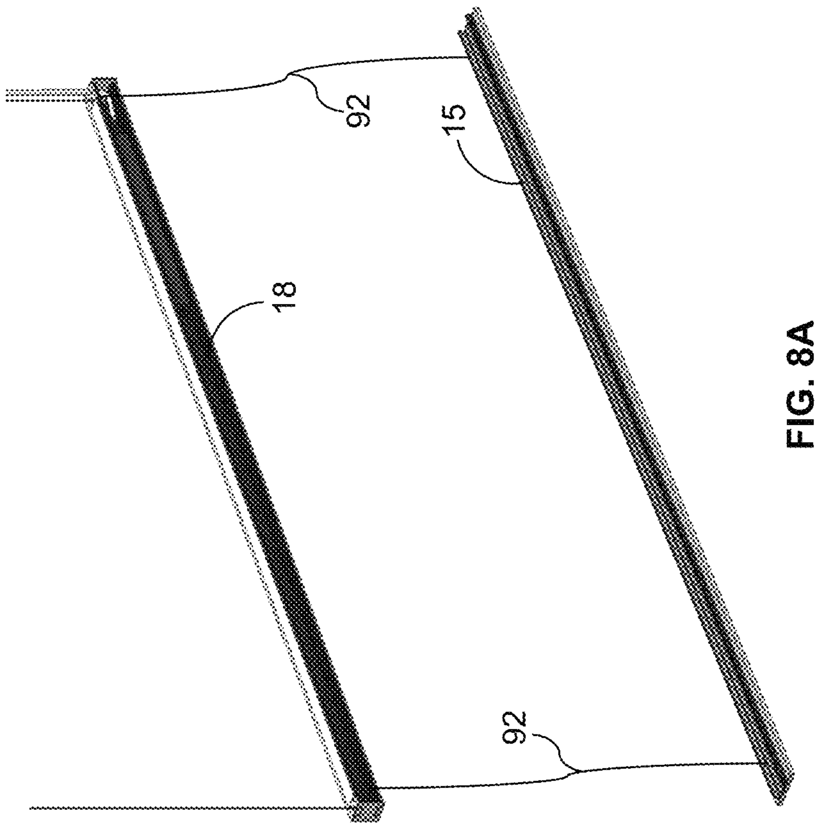

Installation of the first side 15 and second side 18 of the lighting enclosure 12 is illustrated in FIGS. 7A-7C. The directional arrows in FIGS. 7A and 7B illustrate that the first side 15 and the second side 18 of the lighting enclosure 12 are coupled together through the engagement of the hook 46 and flange 49 of the first core section 39 with the first retaining feature 61 and the second retaining feature 63 of the second core section 52 respectively. This allows side-load access to the internal components (i.e., drivers 66, LEDs 68*a-b*, LED boards 73*a-b*, etc.) of the optimized light fixture 10, making it easier for installation, maintenance, and removal of the internal components. In some embodiments, supports 90 and aircraft cable 92 may be used to further connect the first side 15 and the second side 18 of the lighting enclosure 12 as illustrated in FIGS. 8A and 8B. This would be useful so that when the first side 15 and the second side 18 of the lighting enclosure 12 are removed from each other, the first side 15 of the lighting enclosure 12 would hang down making it even easier to perform maintenance on the optimized light fixture 10.

Figure 9C:
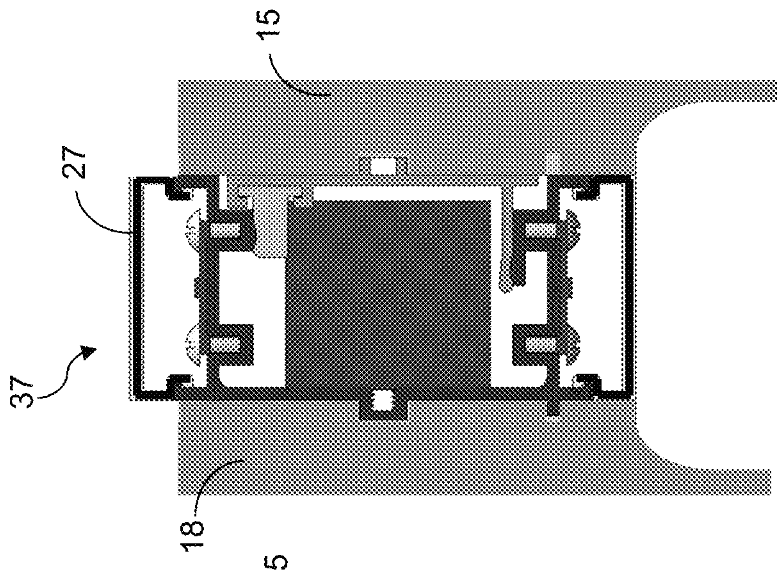
FIGS. 9A-9C illustrate different embodiments of a lighting enclosure in accordance with some embodiments.
Figure 9B:
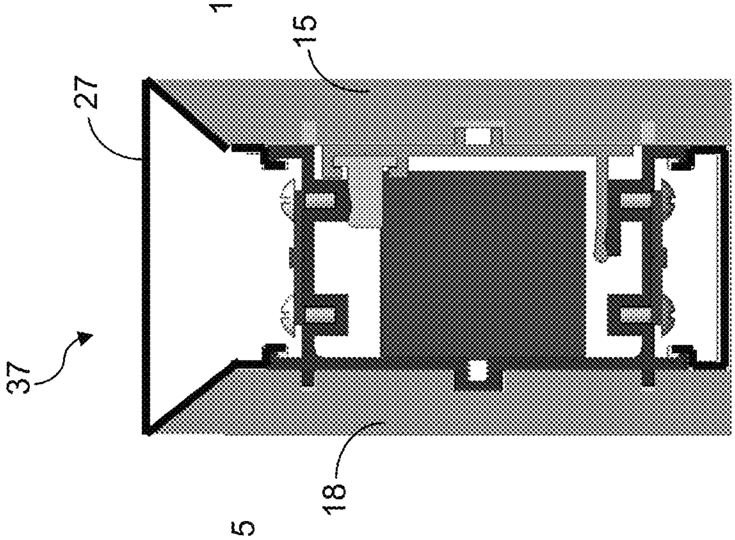
Figure 9A:
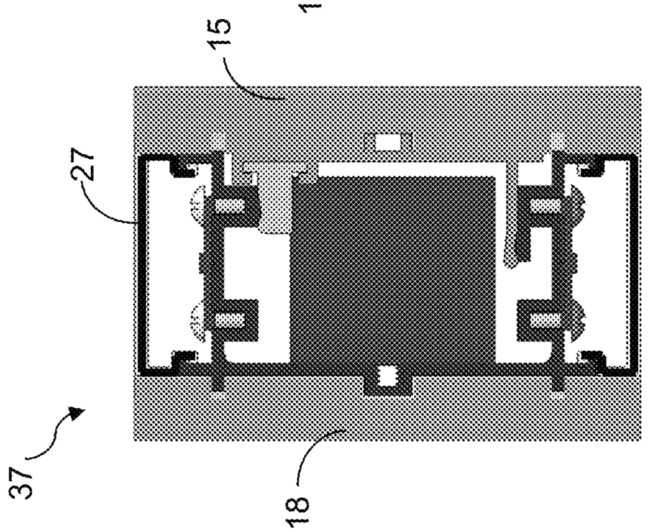

As illustrated in FIGS. 9A-9C, the arrangement of the optimized light fixture 10 may provide the ability to change the functional design of the lighting enclosure 12. For example, the top section 27 (or diffuser) may have different shapes as illustrated in FIGS. 9B and 9C. The shape of the first side 15 and the second side 18 of the lighting enclosure 12 can even be changed to achieve a specific functional goal or aesthetic choice as illustrated in FIGS. 9B and 9C. For example, the wood first side 15 and the second side 18 of the lighting enclosure 12 may contain specific geometric features to shape and shield light along the length of the LED diffusers making up the majority of top section 27. The wood first side 15 and the second side 18 of the lighting enclosure 12 may have undercuts that capture edges of the top section 27 (or diffuser) for narrow-beam applications. The wooden profiles may have asymmetrical profiles for asymmetric beams. The wood first side 15 and the second side 18 of the lighting enclosure 12 may be customized for different light spreads and/or top section 27 (or diffuser) widths. This correlates to the amount of glare produced by the fixture. Being able to change the size of the diffuser area (i.e., the top section 27 and bottom section 30) and the shielding around it using wood, without needing to invest in more metal hardware components, allows the optimized light fixture 10 to be employed to achieve a variety of project requirements with one minimal aluminum profile.

Figure 10B:
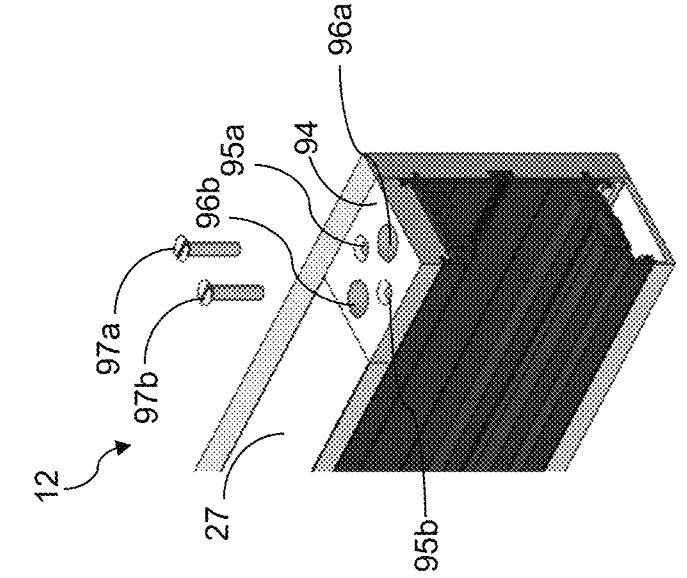
FIGS. 10A-10B illustrate an isometric version of the header attachment for the lighting enclosure in accordance with some embodiments.
Figure 10A:
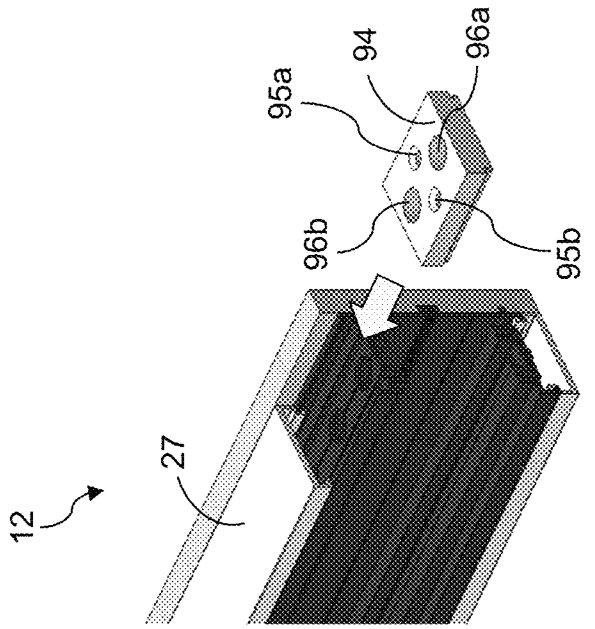
Figure 11B:
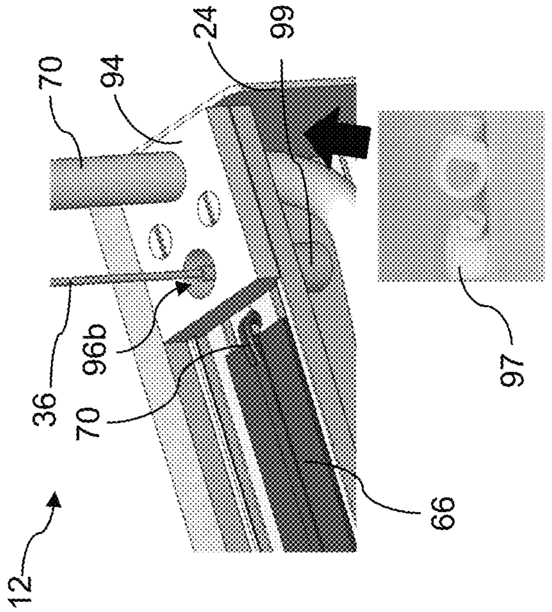
FIGS. 11A-11B illustrate views of the internal components and external attachment to the lighting enclosure.
Figure 11A:
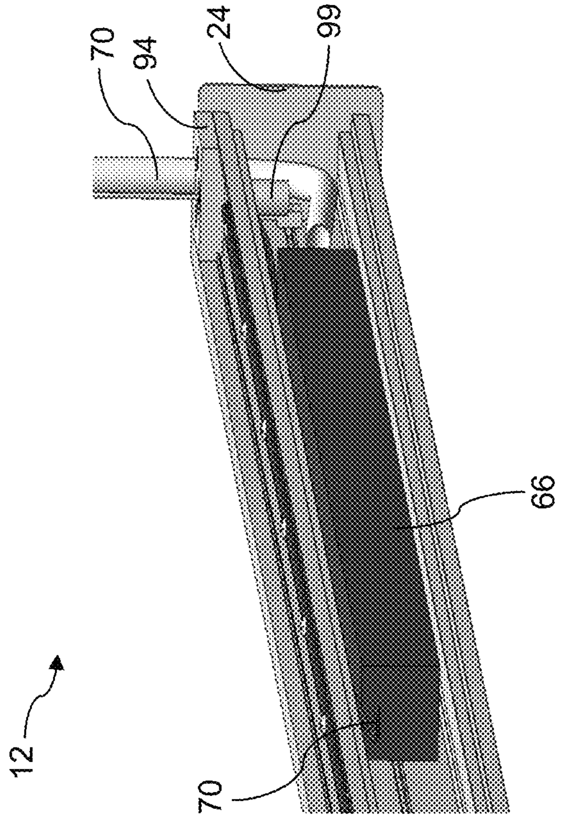
Figure 12:
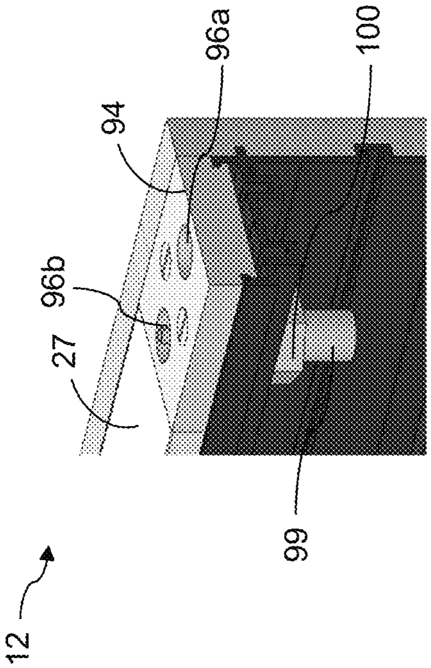
FIG. 12 illustrates a retention element to attach the lighting enclosure to a cable in accordance with some embodiments.

As illustrated in FIGS. 10A and 10B, the lighting enclosure 12 includes a header 94 that is operatively coupled to the top section 27 of the lighting enclosure 12. The header 94 comprises a plurality of fixture holes 95*a-b* and a plurality of ports 96*a-b*. The fixture holes 95*a-b* are sized and configured to receive screws 97*a-b* to couple the header 94 to the top section 27 of the lighting enclosure 12. The port 96*a* of the header 94 is configured to receive line voltage through a power chord 70 to power the driver 66 as illustrated in FIGS. 11A and 11B. In some embodiments, the strain relief 97 feature illustrated in FIG. 11B is provided to protect the power chord 70 as it is fed through the header 94 and into the channel 33 of the lighting enclosure 12. The port 96*b* of the header 94 is configured to receive a retention element 99 that is configured to attach the lighting enclosure 12 to cables 35, 36 as illustrated in FIGS. 11A-12. In some embodiments, the retention element 99 is a cable gripper that is configured to slide into a hole within the top section 27 and port 96 in order to suspend the lighting enclosure 12 in the air, such as from the ceiling. The retention element 99 is then locked in place with a fastener 100, such as a hex nut and lock washer.

Figure 13C:
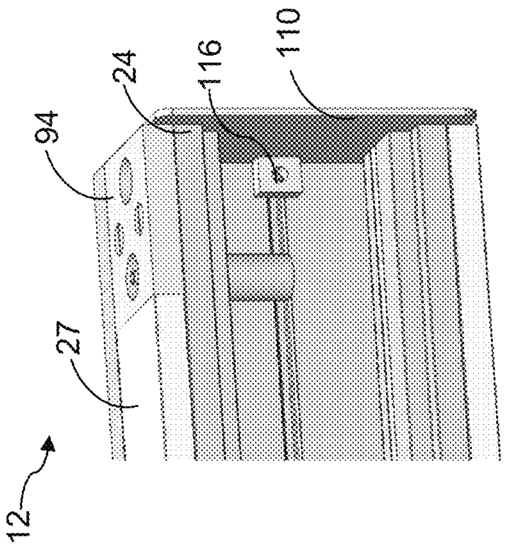
FIGS. 13A-13C illustrate the end caps of the lighting enclosure in accordance with some embodiments.
Figure 13B:
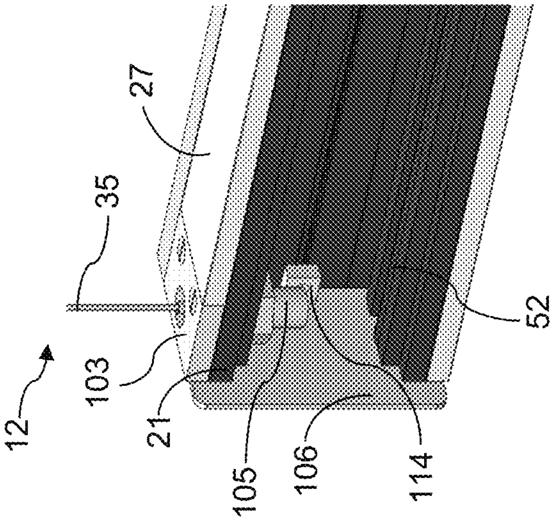
Figure 13A:
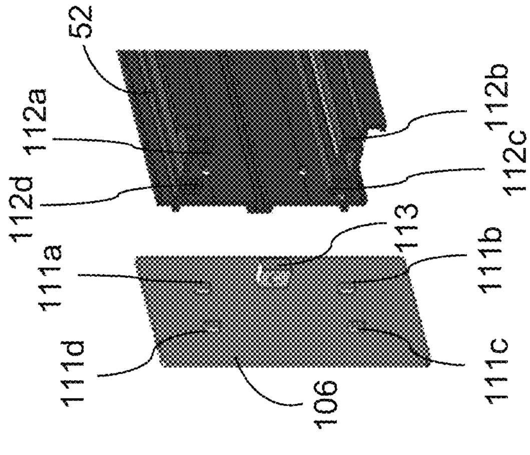

Referring now to FIGS. 13A-13C, the lighting enclosure 12 further includes a second header 103 that is operatively coupled to the top section 27 at the first end 21 of the lighting enclosure 12. This second header 103 also includes a second retention element 105 that is configured to pass through the second header 103 and retain the cable 35 so that the optimized light fixture 10 can be hung from the ceiling. It is contemplated that the header 94 and second header 103 can be located anywhere along length of the lighting enclosure 12 and can include more than two.

Additionally, the lighting enclosure 12 includes a first end cap 106 that is operatively coupled to the first end 21 of the lighting enclosure 12 and a second end cap 110 that is operatively coupled to the second end 24 of the lighting enclosure 12. The first end cap 106 and the second end cap 110 are operatively coupled to the lighting enclosure 12 through the first fixation aperture 114 and the second fixation aperture 116 respectively. For the light modules 37 that require an all metal enclosure to satisfy the UL regulations the first end cap 106 and the second end cap 110 are metal to create a full metal enclosure within channel 33. The first end cap 106 and the second end cap 110 may be structurally connected to the second core section 52 to enable first end cap 106 and the second end cap 110 to expand and contract with the aluminum of the second core section 52 independent of the wood that is used for the second side 18 of the lighting enclosure 12. The metal first end cap 106 and the second end cap 110 may include a gasket to manage the aesthetic impact of the gap between the end caps 106, 110 and the first side 15 of the lighting enclosure 12. The metal end caps 106, 110 may include novel attachment features that include nubs 111a-d in the end cap 106, 110 that mate with grooves 112*a-d* in the second core section 52 to ensure alignment.

Figure 14C:
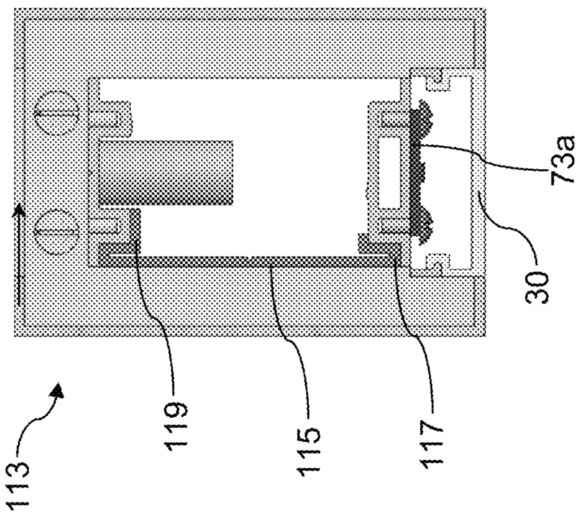
FIGS. 14A-14C illustrate an alternative light module in accordance with some embodiments.
Figure 14B:
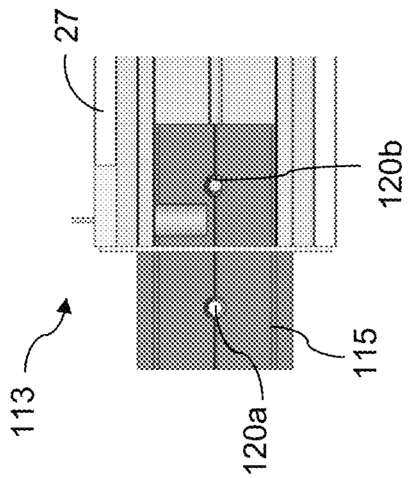
Figure 14A:
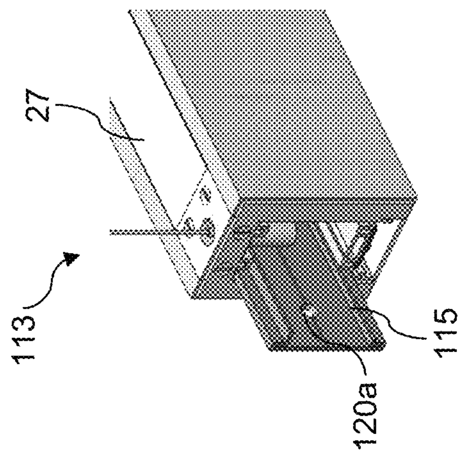
Figure 15B:
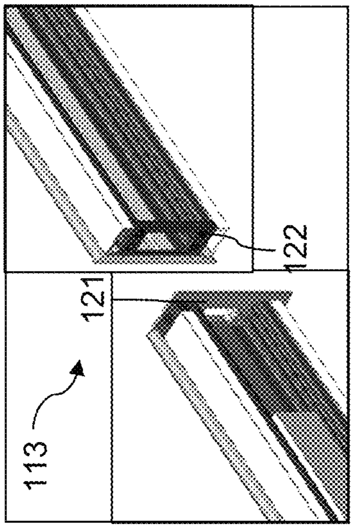
FIGS. 15A-15D illustrate the coupling of multiple light modules in accordance with some embodiments.
Figure 15D:
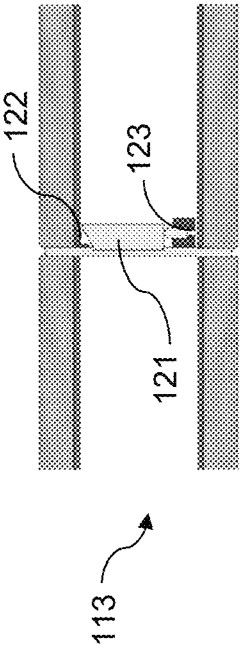
Figure 15A:
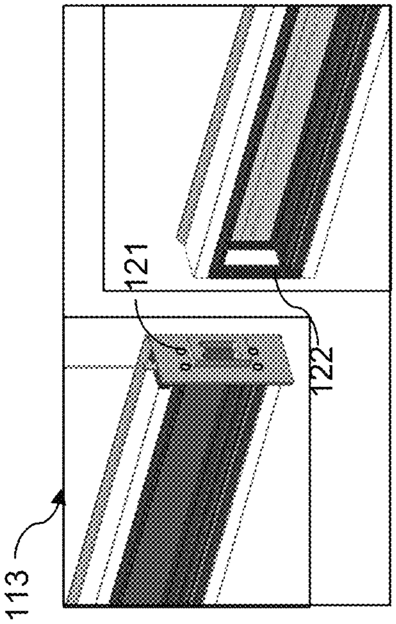
Figure 15C:
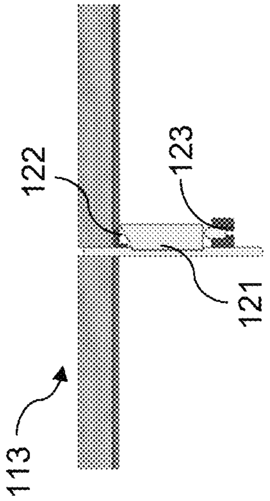

Referring now to FIGS. 14A-14C, the lighting enclosure 12 may be one long continuous light module 113 (type A module) that houses the necessary wiring and driver(s) 66 within channel 33. As illustrated in FIGS. 14A-14C. the joining segment 115 slides into lighting enclosure 12 and engages the second core section 52 with ledges 117, 119. The joining segment 115 can be mounted directly to the first side 15 or second side 18 with fasteners (not shown) through a plurality of fixation apertures 120*a-b*, depending on the orientation of installation. A side-loading door in the lighting enclosure 12 allows for easy installation of joining segment 115. It shall be noted that the light module 113 can include just one LED board 73 in a downward facing direction as illustrated in FIG. 14C. When end caps 106, 110 are installed, the light module 113 is formed of a complete metal enclosure as required by UL regulations or the drivers 66 and line-voltage connections, such as connections to power chord 70.

When continuous light modules 113, such as those described for FIGS. 14A-14C, are connected together. there is are complementary bridging pieces, such as male portion 121 and female portion 122 that structurally secures the abutting light modules 113 as illustrated in FIGS. 15A-15D. One way to lock these continuous light modules 113 to form a singular lighting enclosure 12 is to use a set screw 123 to lock the two light modules 37 together. The set screw 123 is accessible via the side-loading door when the first side 15 and the second side 18 of the lighting enclosure 12 are pulled apart.

Figure 16:
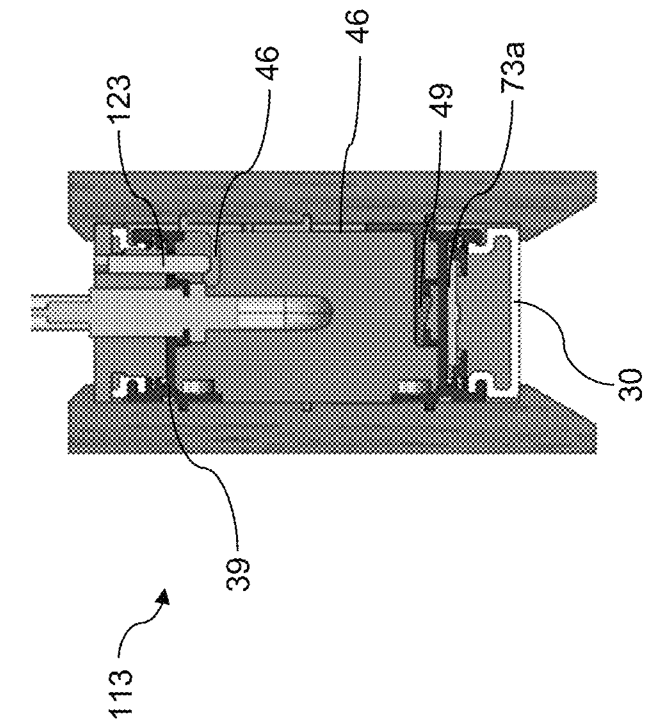
FIG. 16 illustrates the coupling of light modules with a set screw in accordance with some embodiments.

In order to gain access to the internal portion of the optimized light fixture 10, the side-loading door can be opened. At each end of the light module 113, a set screw 123 or other means of mechanical fastening that mechanically holds the ends of the side-loading door in place. This set screw 123 squeezes the first core section 39 and the second core section 52 when tightened, ensuring a tight tolerance between parts of the light fixture modules 113. This helps create continuity between connected module segments as shown in FIG. 16.

Figure 17B:
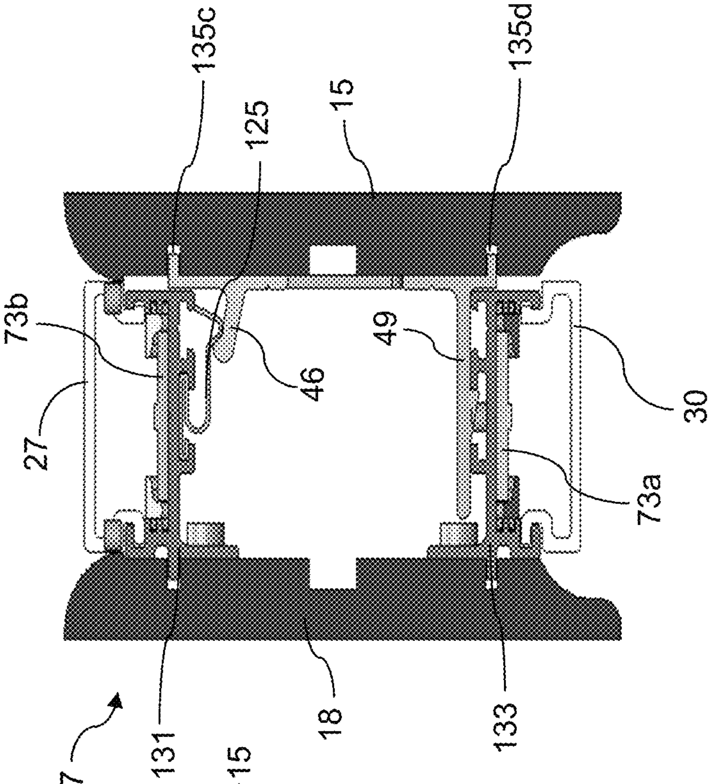
FIGS. 17A-17B illustrate an alternative structure for a light module in accordance with some embodiments.
Figure 17A:
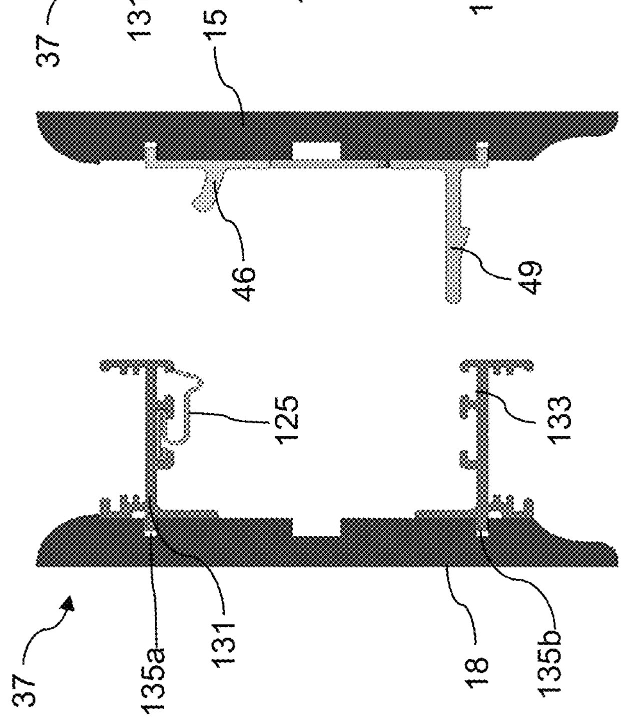

Referring now to FIGS. 17A and 17B, alternative methods of attaching the first core section 39 and the second core section 52 are described herein. For example, instead of a first retaining feature 61 disposed on the second core section 52, a spring 125 can be used to engage hook 46 to releasably couple the first core section 39 and the second core section 52 together. Additionally, in an effort to reduce the metal within the lighting enclosure 12, the second core section 52 can be made up of two or more fragments 131 and 133 that are configured to engage the first core section 39. Fragments 131 and 133 can be operatively coupled to the second side 18 directly through grooves 135*a-b*, respectively. In other embodiments, the first core section 39 can be made up of several fragments to further reduce the metal content in the lighting enclosure 12. For example, the hook 46 and the flange 49 can be individual pieces. In this embodiment, the hook 46 can fit within a groove 135*c*, and the flange 49 can fit within groove 135*d* of the first side 15 of the lighting enclosure 12.

The wooden profiles for the first side 15 and the second side 18 of the lighting enclosure 12 may include a variety of the following features, such as having a very low carbon footprint. The wood first side 15 and the second side 18 of the lighting enclosure 12 may camouflage the difference between type A (continuous) and type B (non-continuous) light modules 37. The wood first side 15 and the second side 18 of the lighting enclosure 12 are operatively coupled to the first core section 39 and the section core section 52 as discussed above to preserve wood straightness. The first side 15 and the second side 18 of the lighting enclosure 12 are dimensioned and quarter-sawn to reduce warping or cupping.

The wood first side 15 and the second side 18 of the lighting enclosure 12 may have a cosmetic surface disposed on the outer surface that makes the fixture pleasing to look at. The wood first side 15 and the second side 18 of the lighting enclosure 12 may include wood that completely covers aluminum core (i.e., the first core section 39 and the second core section 52), which eliminates the need for the aluminum core to be anodized or powder-coated. This reduces the environmental impact of the fixture. Eco-friendly stains can be used on the wood in lieu of chemical-intensive paints on metal.

In some embodiments, if aesthetics was not a priority and light shielding was achieved by other means, the wood cladding for the first side 15 and the second side 18 of the lighting enclosure 12 can be removed. In various embodiments, if continuity between modules was not a priority, type A modules, such as the continuous light module 113 discussed with reference to FIGS. 15A-15D, can have no wood and type B modules, such as the segmented light module 37 discussed with reference to FIGS. 3-6, can be just wood. In some embodiments, the light fixture 10 may include a plurality of lighting enclosures 12 that are joined together having both type A (continuous) modules and type B (non-continuous) light modules 37, 113.

In various embodiments, if production costs and straightness first side 15 and the second side 18 of the lighting enclosure 12 were not a priority, the aluminum core (i.e., first core section 39 and the second core section 52) may be eliminated. In various embodiments drivers 66 and/or other electrical-connects would be housed in localized metal boxes and lighting module 37 (i.e., LED 68 and diffuser 27 assemblies) connected to the wood, such as the first side 15 and the second side 18 of the lighting enclosure 12, separately.

In various embodiments, the lighting enclosure 12 can be made by other means (i.e., bent metal) and/or other metals, such as steel. For example, the lighting module 37 can be composed entirely of wood. In various embodiments, the end caps 106, 110 can enable angled connections and is not limited to linear connections. In various embodiments, the modules can be curved, not straight.

The described design approach above, the lighting module 37 without metals, presents unique design challenges because: (1) UL regulations require drivers 66 and line-voltage electrical connections, such as connections to power chord 70, to be housed in metal; and (2) LEDs 68*a-b* need a heat-sink and metal is a very efficient heat sink. The vast majority of energy usage for a light fixture is during use and not the embodied carbon in the enclosure, so the design of the fixture needs to prioritize optimal use conditions for the LEDs 68*a-b* and drivers 66 along with optimal heat sinking, which is accomplished with the optimized light fixture 10 of the current disclosure.

Moreover, metal reduction may be achieved through part elimination and/or thinner metal walls of the optimized light fixture 10. Since the optimized light fixture 10 provides access to the drivers 66 from the side, LED trays, can be eliminated entirely and affix the LED boards 73*a-b* directly to the second core section 52. This helps reduce the overall metal volume of the fixture. Regarding thinner metal walls, the substitution of metal with materials (i.e., wood) that have lower embodied carbon impacts may be implemented. The combination of wood and aluminum used for the current disclosure, enables the overall thickness of the first core section 39 and second core section 52 to be made thinner than other designs because the wood used in the first side 15 and the second side 18 of the lighting enclosure 12 and aluminum first core section 39 and second core section 52 reinforce one another to achieve structural strength.

In some embodiments, a light fixture may include a lighting enclosure having a first side and a second side, a first end and a second end, and a top section and a bottom section that all define a channel within the lighting enclosure. The light fixture may also include at least one light module disposed within the lighting enclosure. The light module may have a first core section and a second core section. The first core section may have a first retention element disposed on the first core section. The second core section may have a second retention element disposed on the second core section. The first retention element may be configured to engage the second retention element, releasably coupling the first core section and the second core section together allowing side access to a plurality of internal components of the light fixture. The light module may also include at least one light source operatively coupled to a top portion of the second core section.

In some embodiments, at least the top section of the lighting enclosure may include a diffuser disposed between the first side and the second side of the lighting enclosure that is configured to diffuse light from the at least one light source.

In some embodiments, the light module may also include a driver disposed within the operatively coupled first core section and second core section. The driver may be configured to power the at least one light source.

In some embodiments, the first side and the second side of the lighting enclosure may be made of wood.

In some embodiments, the light module may include a second light source operatively coupled to a bottom portion of the first core section.

In some embodiments, the bottom section of the lighting enclosure may include a diffuser disposed between the first side and the second side of the lighting enclosure that is configured to diffuse light from the second light source.

In some embodiments, the first core section and the second core section may be further connected by an aircraft cable.

In some embodiments, the first core section further may include a lip configured to retain a first end of the at least one light source.

In some embodiments, a second end of the at least one light source may be operatively coupled to the first core section with a fastener.

In some embodiments, the first core section and the second core section may be made of aluminum.

In some embodiments, the light fixture may include a plurality of light modules.

In some embodiments, a light fixture may include a lighting enclosure having a first side and a second side, a first end and a second end, and a top section and a bottom section that all define a channel within the lighting enclosure. The light fixture may also include a plurality of light modules disposed within the lighting enclosure. Each of the plurality of light modules may include a first core section and a second core section. The first core section may have a first retention element disposed on the first core section and the second core section may have a second retention element disposed on the second core section. The first retention element may be configured to engage the second retention element, releasably coupling the first core section and the second core section together allowing side access to a plurality of internal components of the light fixture. The plurality of light modules may have at least one first light source operatively coupled to a top portion of the second core section. The plurality of light modules may have at least one second light source operatively coupled to a bottom portion of the second core section.

In some embodiments, at least the top section and the bottom section of the lighting enclosure may each include a diffuser disposed between the first side and the second side of the lighting enclosure that are configured to diffuse light.

In some embodiments, the plurality of light modules may have at least one driver disposed within the operatively coupled first core section and second core section. The driver may be configured to power the at least one light source on the top portion of the second core section and the at least one light source on the bottom portion of the second core section for each of the plurality of light modules.

In some embodiments, the first side and the second side of the lighting enclosure may be made of wood.

In some embodiments, the first core section and the second core section may be further connected by an aircraft cable.

In some embodiments, the first core section further may include a lip configured to retain a first end of the first light source.

In some embodiments, a second end of the first light source may be operatively coupled to the first core section with a fastener.

In some embodiments, the first core section and the second core section may be made of aluminum.

In some embodiments, the first core section and the second core section may be made of wood.

In some embodiments, the first retaining feature on the second core section may be a spring.

In some embodiments, the hook may be locked to the first core section with a set screw.

In some embodiments, a light fixture may include a lighting enclosure having a first side and a second side, a first end and a second end, and a top section and a bottom section that all define a channel within the lighting enclosure. The light fixture may also include at least one light module disposed within the lighting enclosure that has a first core section and a second core section, wherein the first core section has a first retention element disposed on the first core section and the second core section has a second retention element disposed on the second core section, and wherein the first retention element is configured to engage the second retention element, releasably coupling the first core section and the second core section together allowing side access to a plurality of internal components of the light fixture. The light fixture may also have at least one light source operatively coupled to a bottom portion of the second core section.

In some embodiments, wherein at least the bottom section of the lighting enclosure may include a diffuser disposed between the first side and the second side of the lighting enclosure that is configured to diffuse light from the at least one light source.

In some embodiments, the light fixture may also include a driver disposed within the operatively coupled first core section and second core section, wherein the driver is configured to power the at least one light source.

In some embodiments, the first side and the second side of the lighting enclosure may be made of wood.

In some embodiments, the light module may also include a second light source operatively coupled to a top portion of the first core section.

In some embodiments, the top section of the lighting enclosure may include a diffuser disposed between the first side and the second side of the lighting enclosure that is configured to diffuse light from the second light source.

In some embodiments, the first core section and the second core section may be connected by an aircraft cable.

In some embodiments, the first core section further may include a lip configured to retain a first end of the at least one light source.

In some embodiments, a second end of the at least one light source may be operatively coupled to the first core section with a fastener.

In some embodiments, the first core section and the second core section are made of aluminum.

In some embodiments, the light fixture may include a plurality of light modules.

The foregoing is provided for purposes of illustrating, explaining, and describing embodiments of these disclosures. Modifications and adaptations to these embodiments will be apparent to those skilled in the art and may be made without departing from the scope or spirit of these disclosures.

It may be emphasized that the above-described embodiments, particularly any "preferred" embodiments, are merely possible examples of implementations, merely set forth for a clear understanding of the principles of the disclosure. Many variations and modifications may be made to the above-described embodiments of the disclosure without departing substantially from the spirit and principles of the disclosure. All such modifications and variations are intended to be included herein within the scope of this disclosure.

While this specification contains many specifics, these should not be construed as limitations on the scope of any disclosures, but rather as descriptions of features that may be specific to particular embodiment. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

What is claimed is:

1. A light fixture comprising:

a lighting enclosure having a first side and a second side, a first end and a second end, and a top section and a bottom section that all define a channel within the lighting enclosure;

at least one light module disposed within the lighting enclosure comprising:

a first core section operatively coupled to the first side of the lighting enclosure and a second core section operatively coupled to the second side of the lighting enclosure, wherein the first core section has a first retention element disposed on the first core section and the second core section has a second retention element disposed on the second core section, the first retention element comprising at least one hook and at least one flange, and the second retention element comprising at least one first retaining feature and at least one second retaining feature, and wherein the at least one hook and the at least one flange are configured to engage the at least one first retaining feature and the at least one second retaining feature respectively, releasably coupling the first core section and the second core section together allowing side access to a plurality of internal components of the light fixture; and at least one light source operatively coupled to a top portion of the second core section.

2. The light fixture of claim 1, further comprising a second light source operatively coupled to a bottom portion of the first core section.

3. The light fixture of claim 2, wherein the bottom section of the lighting enclosure comprises a diffuser disposed between the first side and the second side of the lighting enclosure that is configured to diffuse light from the second light source.

4. The light fixture of claim 1, wherein the first core section further comprises a lip configured to retain a first end of the at least one light source.

5. The light fixture of claim 4, wherein a second end of the at least one light source is operatively coupled to the first core section with a fastener.

6. The light fixture of claim 1, wherein at least the top section of the lighting enclosure comprises a diffuser disposed between the first side and the second side of the lighting enclosure that is configured to diffuse light from the at least one light source.

7. The light fixture of claim 1, further comprising a driver disposed within the operatively coupled first core section and second core section, wherein the driver is configured to power the at least one light source.

8. The light fixture of claim 1, wherein the first side and the second side of the lighting enclosure are made of wood.

9. The light fixture of claim 1, wherein the first core section and the second core section are further connected by cable.

10. The light fixture of claim 1, wherein the first core section and the second core section are made of aluminum.

11. The light fixture of claim 1, further comprising a plurality of light modules.

12. A light fixture comprising:

a lighting enclosure having a first side and a second side, a first end and a second end, and a top section and a bottom section that all define a channel within the lighting enclosure;

a plurality of light modules disposed within the lighting enclosure, wherein each of the plurality of light modules comprise:

a first core section operatively coupled to the first side of the lighting enclosure and a second core section operatively coupled to the second side of the lighting enclosure, wherein the first core section has a first retention element disposed on the first core section and the second core section has a second retention element disposed on the second core section, the first retention element comprising at least one hook and at least one flange, and the second retention element comprising at least one first retaining feature and at least one second retaining feature, and wherein the at least one hook and the at least one flange are configured to engage the at least one first retaining feature and the at least one second retaining feature respectively, releasably coupling the first core section and the second core section together allowing side access to a plurality of internal components of the light fixture;

at least one first light source operatively coupled to a top portion of the second core section; and at least one second light source operatively coupled to a bottom portion of the second core section.

13. The light fixture of claim 12, wherein the first core section further comprises a lip configured to retain a first end of the at least one first light source.

14. The light fixture of claim 13, wherein a second end of the at least one first light source is operatively coupled to the first core section with a fastener.

15. The light fixture of claim 12, wherein at least the top section and the bottom section of the lighting enclosure each comprise a diffuser disposed between the first side and the second side of the lighting enclosure that are configured to diffuse light.

16. The light fixture of claim 12, further comprising at least one driver disposed within the releasably coupled first core section and second core section, wherein the at least one driver is configured to power the at least one light source on the top portion of the second core section and the at least one light source on the bottom portion of the second core section for each of the plurality of light modules.

17. The light fixture of claim 12, wherein the first side and the second side of the lighting enclosure are made of wood.

18. The light fixture of claim 12, wherein the first core section and the second core section are further connected by cable.

19. The light fixture of claim 12, wherein the first core section and the second core section are made of aluminum.

20. The light fixture of claim 12, wherein the first core section and the second core section are made of wood.

21. The light fixture of claim 12, wherein the at least one first retaining feature on the second core section is a spring.

22. The light fixture of claim 12, wherein the at least one hook is locked to the first core section with a set screw.

23. A light fixture comprising:

a lighting enclosure having a first side and a second side, a first end and a second end, and a top section and a bottom section that all define a channel within the lighting enclosure;

at least one light module disposed within the lighting enclosure comprising:

a first core section operatively coupled to the first side of the lighting enclosure and a second core section operatively coupled to the second side of the lighting enclosure, wherein the first core section has a first retention element disposed on the first core section and the second core section has a second retention element disposed on the second core section, the first retention element comprising at least one hook and at least one flange, and the second retention element comprising at least one first retaining feature and at least one second retaining feature, and wherein the at least one hook and the at least one flange are configured to engage the at least one first retaining feature and the at least one second retaining feature respectively, releasably coupling the first core section and the second core section together allowing side access to a plurality of internal components of the light fixture; and at least one light source operatively coupled to a bottom portion of the second core section.

24. The light fixture of claim 23, further comprising a second light source operatively coupled to a top portion of the first core section.

25. The light fixture of claim 24, wherein the top section of the lighting enclosure comprises a diffuser disposed between the first side and the second side of the lighting enclosure that is configured to diffuse light from the second light source.

26. The light fixture of claim 23, wherein at least the bottom section of the lighting enclosure comprises a diffuser disposed between the first side and the second side of the lighting enclosure that is configured to diffuse light from the at least one light source.

27. The light fixture of claim 23, further comprising a driver disposed within the operatively coupled first core section and second core section, wherein the driver is configured to power the at least one light source.

28. The light fixture of claim 23, wherein the first side and the second side of the lighting enclosure are made of wood.

29. The light fixture of claim 23, wherein the first core section and the second core section are further connected by cable.

30. The light fixture of claim 23, wherein the first core section further comprises a lip configured to retain a first end of the at least one light source.

31. The light fixture of claim 30, wherein a second end of the at least one light source is operatively coupled to the first core section with a fastener.

32. The light fixture of claim 23, wherein the first core section and the second core section are made of aluminum.

33. The light fixture of claim 23, further comprising a plurality of light modules.

* * * * *